No. 806,177. PATENTED DEC. 5, 1905.
P. C. OSCANYAN.
STEAM TURBINE.
APPLICATION FILED MAR. 18, 1905.

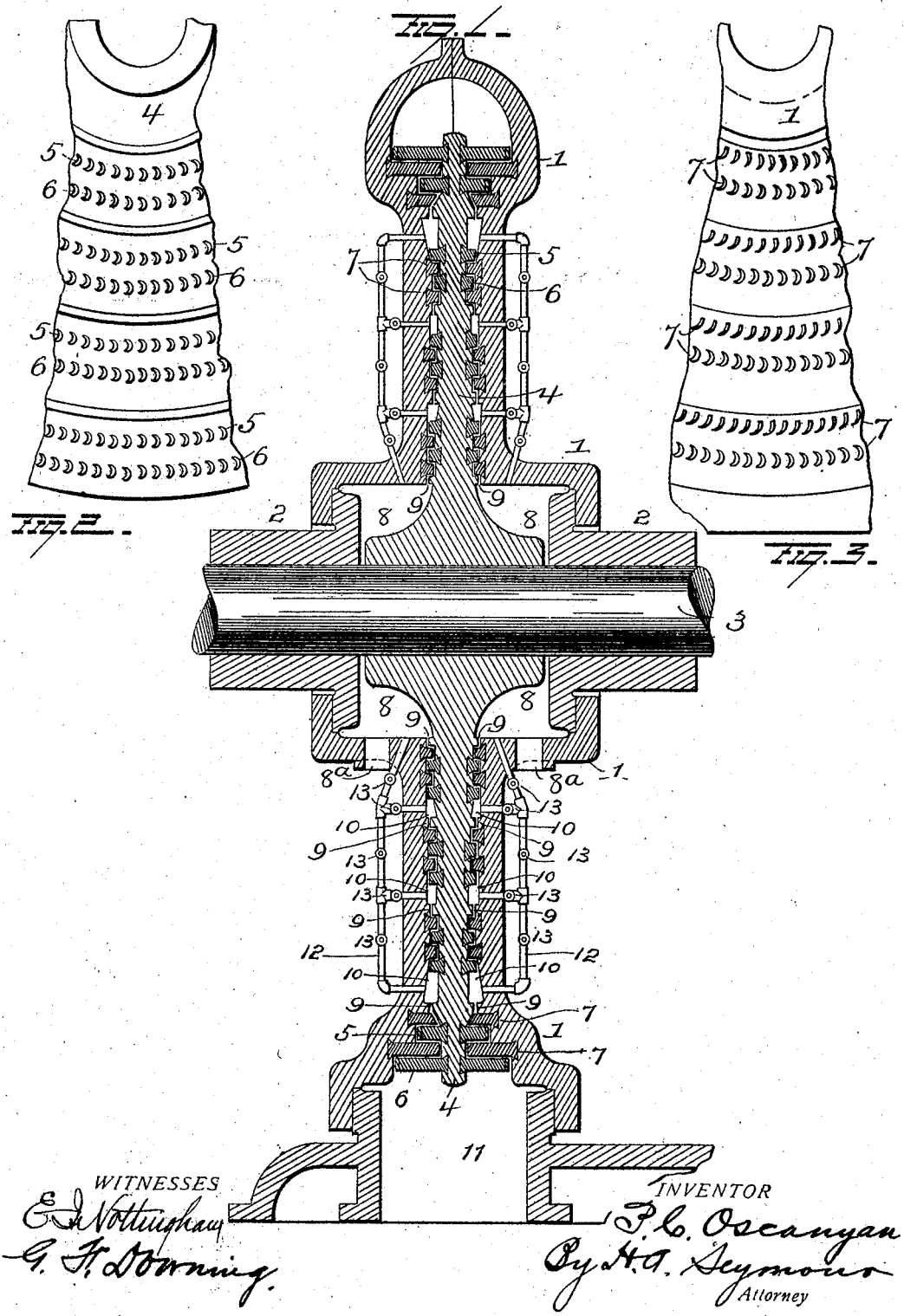

2 SHEETS—SHEET 2.

WITNESSES
E. J. Nottingham
G. F. Downing

INVENTOR
P. C. Oscanyan
By H. A. Seymour
Attorney

UNITED STATES PATENT OFFICE.

PAUL C. OSCANYAN, OF EAST ORANGE, NEW JERSEY, ASSIGNOR OF ONE-FOURTH TO GEORGE A. THOMSON, OF SOMERVILLE, NEW JERSEY, AND ONE-FOURTH TO THE ADAMS BAGNALL ELECTRIC COMPANY, OF CLEVELAND, OHIO.

STEAM-TURBINE.

No. 806,177.     Specification of Letters Patent.     Patented Dec. 5, 1905.

Application filed March 18, 1905. Serial No. 250,767.

To all whom it may concern:

Be it known that I, PAUL C. OSCANYAN, a resident of East Orange, in the county of Essex and State of New Jersey, have invented certain new and useful Improvements in Steam-Turbines; and I do hereby declare the following to be a full, clear, and exact description of the invention, such as will enable others skilled in the art to which it appertains to make and use the same.

My invention relates to steam-turbines, the object of the invention being to provide a turbine of that class having radial flow of fluid or horizontal flow with several annular adiabatic expansion-chambers and one or more series of vanes or buckets between said chambers for absorbing the kinetic energy.

A further object is to provide means for regulating the pressure of the elastic fluid in each annular chamber and, further, to provide a turbine having a minimum number of parts.

With these objects in view the invention consists in certain novel features of construction and combinations and arrangements of parts, as will be more fully hereinafter described, and pointed out in the claims.

Figure 4:
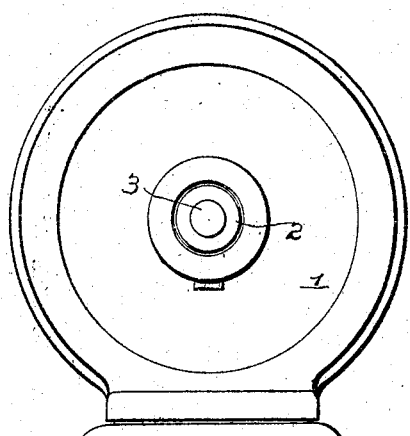

In the accompanying drawings, Figure 1 is a view in vertical cross-section, illustrating my improvements. Fig. 2 is a fragmentary face view of the rotary element. Fig. 3 is a fragmentary face view of the stationary element. Fig. 4 is a side view of the casing, and Fig. 5 is a view in longitudinal section, illustrating a modification.

1 represents a casing having central bearings 2 for a shaft 3, on which is secured my improved rotary element 4, mounted in the casing. This rotary element 4 is of circular formation and is provided at intervals at both sides with twin annular series of buckets 5 and 6, there being four of these twin series shown, although a greater or less number may be employed, if desired. The inner faces of the casing sides are provided with twin annular series of directing-vanes 7, one series being located in advance of the series of buckets 5 and the other series of directing-vanes located between the buckets 5 and 6. The rotary element 4 and casing 1 are so shaped as to form inlet compartments or chambers 8 at the center of the turbine around shaft 3, and inlets 8ª are provided in the casings to admit steam thereto. The casing sides and rotary element are so shaped as to form in advance of each twin series of buckets and vanes annular chambers or passages 9 and annular receiving-chambers 10, gradually increasing throughout that series of buckets, when another annular nozzle or passage is formed and receiving-chamber provided for the next series of buckets, each succeeding nozzle and receiving-chamber from the axis outward increasing in size, and the steam from the outer series of buckets escapes through outlet 11. All of the receiving-chambers 10 are connected by pipes 12 with inlet-chambers 8, and cocks 13 are provided in said pipes to regulate the supply from the expansion-chambers to the receiving-chamber to properly balance the pressure of steam throughout the turbine.

The operation of my improvements is as follows: Steam is admitted at the inlets 8ª 8ª to the annular chambers 8 on each side of the rotating element at a pressure of, say, one hundred and fifty pounds. It is then adiabatically expanded in the annular chamber 9 to, say, one hundred pounds, and the kinetic energy developed is absorbed as follows: The steam upon leaving the passage strikes the first row of stationary vanes 7, which are parabolic in cross-section, which direct the steam against the first row of buckets 5 upon the rotating element, thereby imparting a rotary motion thereto. The kinetic energy that is not absorbed is directed against the next row of directing-vanes 7, which directs the steam against the next row of buckets 6, thereby imparting more energy to the rotating element. The steam is then further adiabatically expanded in the next annular chamber or passage and the kinetic energy is repeatedly absorbed until the steam is expanded to the terminal pressure of the turbine, when it exhausts at opening 11 to either the atmosphere or condenser.

Figure 5:
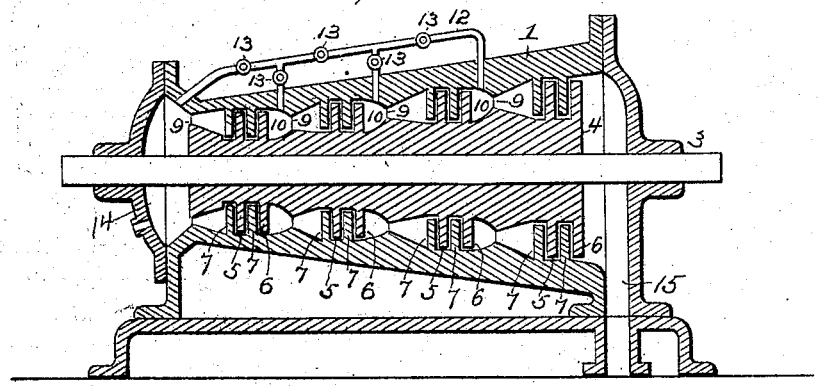

In the modification shown in Fig. 5 my invention is disclosed upon a horizontal-flow turbine, in which steam enters at 14 and exhausts at 15, and the kinetic energy is developed and absorbed in the same manner as in the preferred form of my invention, as will be readily understood.

A great many slight changes might be made in the general form and arrangement of the parts described and pointed out without departing from my invention, and hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. In an elastic-fluid turbine, the combination of a rotary element, and a series of annular chambers constructed to adiabatically expand the elastic fluid.

2. In a turbine, the combination with a rotating element, a series of buckets on said rotating element, and annular chambers on opposite sides of the buckets constructed to adiabatically expand an elastic fluid and compel the buckets to absorb the kinetic energy developed by said chambers.

3. In a turbine, the combination with a rotating element, a stationary element, and said elements so constructed as to form annular chambers to adiabatically expand the elastic fluid.

4. In a radial-flow turbine, the combination of a stationary element, a rotary element, and both elements constructed to form between them annular chambers to adiabatically expand the elastic fluid.

5. In a radial-flow turbine, the combination with a casing, and a shaft therein, of a rotary element in the casing secured on the shaft, several series of buckets on both sides of the rotary element, several series of directing-vanes on the casing, and said rotary element and casing so constructed as to form annular chambers at each series of buckets to adiabatically expand the elastic fluid.

6. In a radial-flow turbine, the combination with rotating and stationary elements forming a series of annular chambers for the adiabatic expansion of steam, said chambers increasing in area from the axis to the periphery of the rotating element.

7. A radial-flow turbine having a rotary member balanced against pressure and a stationary member, each inner side of said stationary member and each side of the rotating member forming a series of annular chambers constructed to adiabatically expand the elastic fluid.

8. A radial-flow turbine, the combination of a balanced rotary member, vanes or buckets on each side of said rotary member, and a stationary member on each side of said rotary member constructed to form a series of annular chambers for the adiabatic expansion of the elastic fluid.

9. An elastic-fluid turbine having a series of annular chambers constructed to adiabatically expand the elastic fluid, each chamber having a by-pass by which the pressure in said chambers can be adjusted.

10. A radial-flow turbine having a series of annular chambers constructed to adiabatically expand the elastic fluid, and each chamber having a by-pass by which the pressure in said chambers may be adjusted.

11. In a radial-flow turbine, the combination of a rotating and stationary element forming a series of annular chambers constructed to adiabatically expand the elastic fluid, each chamber having a by-pass by which the pressure therein may be adjusted.

In testimony whereof I have signed this specification in the presence of two subscribing witnesses.

PAUL C. OSCANYAN.

Witnesses:
F. J. DAVIS,
C. F. SMITH.